US006764233B2

(12) United States Patent
Bean et al.

(10) Patent No.: US 6,764,233 B2
(45) Date of Patent: Jul. 20, 2004

(54) APPARATUS AND METHODS FOR THE USE OF SHRINKABLE PRINT MEDIA

(75) Inventors: Heather N. Bean, Fort Collins, CO (US); Mark Nelson Robins, Greeley, CO (US); Matt Flach, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 86 days.

(21) Appl. No.: 10/097,313

(22) Filed: Mar. 14, 2002

(65) Prior Publication Data

US 2003/0175505 A1 Sep. 18, 2003

(51) Int. Cl.[7] .................................................. B41J 5/30
(52) U.S. Cl. ........................ 400/61; 400/76; 101/487; 101/488
(58) Field of Search ............................. 400/61, 70, 76; 101/487, 488, 128.4

(56) References Cited

U.S. PATENT DOCUMENTS

| | | | |
|---|---|---|---|
| 4,109,851 A | * | 8/1978 | Goates ...................... 229/92.8 |
| 4,756,758 A | * | 7/1988 | Lent et al. ................ 106/31.32 |
| 5,148,196 A | | 9/1992 | Spector ........................ 354/75 |
| 5,514,462 A | | 5/1996 | Endo et al. ................. 428/323 |
| 5,763,032 A | | 6/1998 | Hutt ........................... 428/36.1 |
| 5,922,625 A | | 7/1999 | Haruta et al. ................. 442/75 |
| 5,955,167 A | | 9/1999 | Onishi et al. ............... 428/41.5 |
| 5,962,368 A | | 10/1999 | Poole ........................ 503/227 |
| 6,106,910 A | | 8/2000 | Tan et al. ...................... 428/29 |
| 6,117,553 A | | 9/2000 | Hayashida et al. .......... 428/412 |
| 6,157,865 A | * | 12/2000 | Cromett ....................... 700/95 |
| 6,180,256 B1 | | 1/2001 | Sargeant ..................... 428/500 |
| 6,231,177 B1 | | 5/2001 | Cherukuri et al. .......... 347/105 |
| 6,245,422 B1 | | 6/2001 | Onishi et al. ............... 428/331 |
| 6,255,665 B1 | | 7/2001 | Elgee et al. .............. 250/559.4 |
| 6,444,147 B1 | * | 9/2002 | Harding .................... 264/40.1 |

FOREIGN PATENT DOCUMENTS

WO   WO 9742042 A1 * 11/1997  ........... B44F/11/02

OTHER PUBLICATIONS

IBM Technical Disclosure Bulletin, Preparation of Color Slides Using Heat Shrinkable Material, Nov. 1997, vol. No. 20, Issue No. 6, p. No. 2470.*

* cited by examiner

Primary Examiner—Minh Chau (57) ABSTRACT

Apparatus and methods for the use of shrinkable print media. Various embodiments generate image data accounting for a desired size of an output image and an expected extent of shrinkage of the shrinkable print media. The image data is adapted for use by an imaging device to produce the output image having a size such that an output image having that size prior to shrinking would be expected to have the desired size after shrinking. Further embodiments provide a shrinkable print media having an adhesive attached to at least a portion of one surface. Still further embodiments provide print media kits having shrinkable print media and one or more templates adapted to impart a texture and/or shape to the shrinkable print media in a softened state.

18 Claims, 8 Drawing Sheets

APPARATUS AND METHODS FOR THE USE OF SHRINKABLE PRINT MEDIA

TECHNICAL FIELD OF THE INVENTION

The present invention relates generally to print media, and in particular to apparatus and methods for the use of shrinkable print media.

BACKGROUND OF THE INVENTION

Imaging devices, e.g., inkjet printers, laser printers, plotters, copiers, facsimile machines or multi-function devices, use marking materials, e.g., ink or toner, to print text, graphics and other images onto print media. The print media may be of a variety of types, commonly including paper, card stock, transparencies, envelopes, photographic print stock, cloth, etc. Some common forms of print media include cut-sheet stock, roll stock, tractor-feed stock and fan-fold stock. The chosen form is generally dictated by the imaging device in terms of what it is designed to use. For example, an imaging device designed for cut-sheet stock will generally be unable to handle roll stock or tractor-feed stock. However, it may be able to use fan-fold stock.

One particular print media is a heat-shrinkable media, e.g., Super Color Shrink available through Micro Format, Inc., Wheeling, Ill., USA. This type of shrinkable media is typically based on polystyrene or oriented polypropylene, and generally includes some form of print coating or other surface treatment to increase the printability of its surface. In use, an image is transferred to the shrinkable media and then the media is exposed to heat, commonly in an ordinary oven. Once exposed to heat, generally less than about 250° F. (120° C.), for a period of time, generally measured as a matter of minutes, the media will shrink in at least one dimension. Heat sufficient to initiate contraction of such print media is generally around the glass transition temperature of the material used in the media.

For a sheet media, shrinkage is generally measured in two planar dimensions, e.g., a length and a width of the sheet. The depth or thickness of the sheet will typically increase as the length and/or width decrease during the shrinking process. This increased thickness tends to stiffen the sheet upon cooling. Such media may be designed to shrink symmetrically, such that a shrunk article will have substantially the same proportions of length to width as the original article. An example of a material capable of symmetrical shrinkage includes biaxially oriented polypropylene. Alternatively, the media may be designed to shrink asymmetrically, such that a shrunk article will have proportions of length to width that differ significantly from the original article. An example of a material providing asymmetrical shrinkage includes monoaxially oriented polypropylene. The extent of shrinkage in one or both planar dimensions can be well controlled in the manufacturing process such that the cut-sheet product can be produced having a predetermined extent of shrinkage in each dimension, whether such extent is the same for both dimensions, i.e., symmetrical, or different, i.e., asymmetrical.

SUMMARY

Apparatus and methods for the use of shrinkable print media are described herein. Various embodiments generate image data accounting for a desired size of an output image and an expected extent of shrinkage of the shrinkable print media. The image data is adapted for use by an imaging device to produce the output image having a size such that an output image having that size prior to shrinking would be expected to have the desired size after shrinking. Further embodiments provide a shrinkable print media having an adhesive attached to at least a portion of one surface. Still further embodiments provide print media kits having shrinkable print media and one or more templates adapted to impart a texture and/or shape to the shrinkable print media in a softened state.

For one embodiment, the invention provides a method of using a shrinkable print media. The method includes determining a desired size of an output image and generating image data representative of the output image and accounting for the desired size of the output image and an expected extent of shrinkage of the print media. The image data is adapted for use by an imaging device to produce the output image on the print media having a second size that is greater than the desired size.

For another embodiment, the invention provides a method of using a shrinkable print media. The method includes determining an expected extent of shrinkage of the print media in a first planar dimension and a second planar dimension and determining a desired size of an output image in the first planar dimension and the second planar dimension. The method further includes generating a second size of the output image in the first planar dimension and the second planar dimension, wherein reducing an output image of the second size by the expected extent of shrinkage of the print media would generate an output image having the desired size. The method still further includes generating image data representative of the output image and adapted for use by an imaging device to produce the output image on the print media having the second size.

For yet another embodiment, the invention provides a computer-usable medium having computer-readable instructions stored thereon capable of causing a processor to perform a method. The method includes determining a desired size of an output image, determining a desired print media for use in generating the output image, determining an expected extent of shrinkage of the desired print media and generating image data representative of the output image and accounting for the desired size of the output image and an expected extent of shrinkage of the print media. The image data is adapted for use by an imaging device to produce the output image on the print media having a second size that is greater than the desired size.

For still another embodiment, the invention provides a print media kit. The kit includes at least one sheet of heat-shrinkable print media and at least one template adapted to transfer a texture and/or shape to the print media in a softened state.

For a further embodiment, the invention provides a print media. The print media includes a heat-shrinkable sheet having a first surface and a second surface opposing the first surface. At least one of the surfaces is a printable surface and the second surface has an adhesive covering at least a portion of that surface.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical, chemical or mechanical changes may be made without departing from the scope of the present invention. The following detailed description is, therefore, not to be taken in a limiting sense, and the scope of the present invention is defined only by the appended claims and equivalents thereof.

Figure 1:
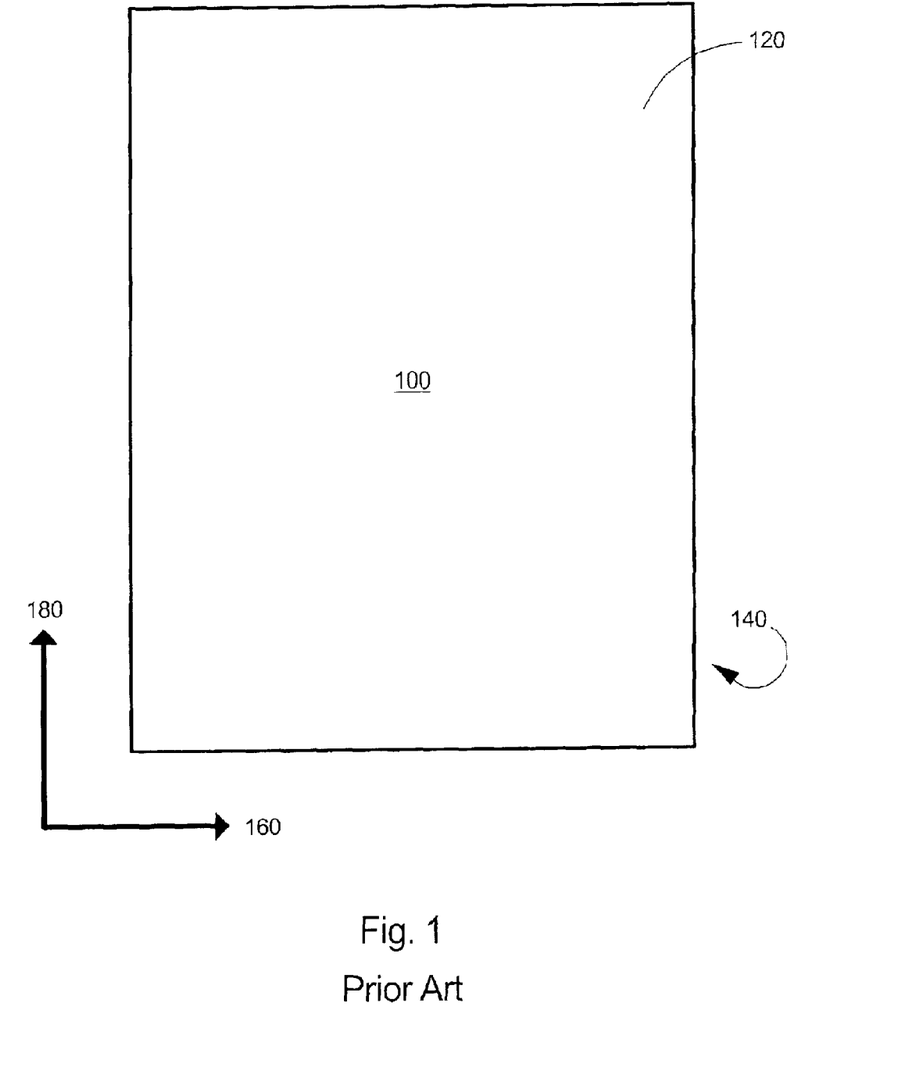
FIG. 1 is a top view of a shrinkable print media for use with various embodiments of the invention.

FIG. 1 is a top view of a shrinkable print media 100 for use with embodiments of the invention. The print media 100 includes a first surface 120 and a second, opposing, surface 140. At least one surface, such as the first surface 120, is a printable surface, meaning that it is capable of accepting marking materials.

The print media 100 is adapted to shrink in at least one of a first dimension 160, e.g., a width, and a second dimension 180, e.g., a length. The shrink is typically initiated through exposure to heat. The extent of shrinkage of the print media 100 in the first dimension 160, i.e., the maximum percentage reduction of the width of the print media 100 when exposed to sufficient heat, has a predetermined value. The extent of shrinkage of the print media 100 in the second dimension 180, i.e., the maximum percentage reduction of the length of the print media 100 when exposed to sufficient heat, has a predetermined positive value. Typical values for the extent of shrinkage range from 20% to 60% or more, although the invention is not limited to print media 100 having a specific extent of shrinkage.

These predetermined values for the extent of shrinkage are preferably known to the user of the print media 100, but need not be. The values of the extent of shrinkage are determined by the manufacturing process used to produce the print media 100 as well as its material of construction. Heat sufficient to produce the extent of shrinkage of the print media 100 is dependent upon the material of construction, but is generally slightly above its glass transition temperature. For example, for a sheet of print media 100 made of polystyrene having a glass transition temperature of about 100° C., heat sufficient to produce the maximum percentage reductions of its length and width may be about 120° C.

Figure 2:
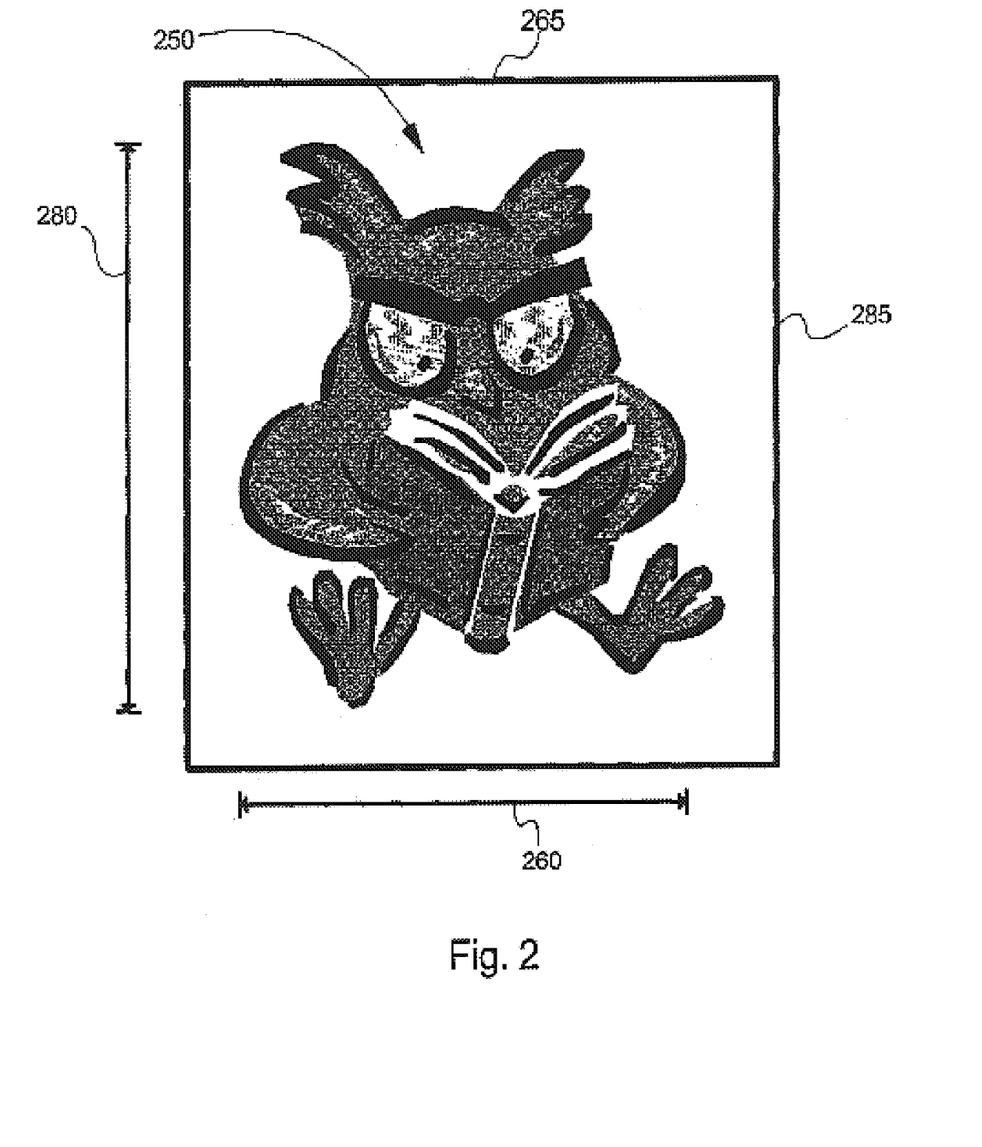
FIG. 2 is view of an image having a size relative to margins

Various embodiments of the invention can be used to produce output images on shrinkable print media that, once shrunk to the expected extent of shrinkage of the print media, would have a predetermined or desired size. As shown in FIG. 2, an image 250 can be defined to have a desired size, commonly measured within the planar dimensions. The desired size can be articulated in terms of a maximum width 260 and a maximum length 280. The image 250 can be a predefined image, such as from clip art collection, a drawing archive or some other set of images selectable by a user of the print media. A user could use the predefined image as-is, or they could resize, distort, customize or otherwise edit the image. Alternatively, the image 250 can be generated entirely by the user, such as through commonly available graphics design software.

The image 250 can be displayed to the user as a display image prior to transferring the image 250 to the print media as the output image. A common example would be to display the image 250 on a computer monitor. The image 250 may further be displayed to the user with margins 265 and 285 to aid the user in defining the desired size of the output image. For one embodiment, the margins 265 and 285 define a maximum width and length, respectively, of a printable surface of the print media upon reducing the print media by its expected extent of shrinkage. Using a standard 8 ½"×11" (216 mm×279 mm) sheet of print media in portrait orientation as an example, and an imaging device requiring margins of ½" (13 mm) on each side, print media having an expected extent of shrinkage of 40% in the width dimension and 50% in the length dimension would have a margin 265 of 4.5" (114 mm) and a margin 285 of 5" (127 mm).

In determining the desired size of the output image, various options are available. For one embodiment, the user can provide values or coordinates explicitly defining the desired size of the output image. For another embodiment, the user can generate or edit the image 250 relative to the margins 265 and 285 such that the size of the image 250 relative to the margins 265 and 285 defines the desired size of the output image. For yet another embodiment, the user can generate or edit the image 250 without regard to margins, and have the embodiment resize the image 250, whether reducing or enlarging, to fit within the margins 265 and 285. For such an embodiment, the image 250 may further be rotated within the margins 265 and 285, if necessary, to facilitate producing an output image having a size that is the maximum size within the printable margins of the print media as used with the imaging device.

Having determined the desired size of the output image, image data representative of the output image is generated. This image data accounts for the desired size of the output image and the expected extent of shrinkage of the pint media. That is, the image data is adapted for use by an imaging device to produce an output image on the print media having a size greater than the desired size, such that upon reducing the output image by the expected extent of shrinkage, the size of the output image would be equal to the desired size. It is recognized that manufacturing processes are not perfect and that an actual extent of shrinkage of a print media would vary within some distribution of the expected value. As such, after shrinking an output image, its actual size may vary from the desired size as controlled by this variation in actual extent of shrinkage.

Calculating the necessary pre-shrink size of the output image adapted to produce the output image having its desired size if reduced by the expected extent of shrinkage is a straightforward calculation. In essence, the desired size is increased by an amount necessary to compensate for the expected shrinkage. In a Cartesian coordinate system, the x and y components could each be multiplied by a corresponding value of (100/[100−N]), where N is the expected extent of shrinkage of the print media in the corresponding dimension expressed as a percentage. Such calculations, even for more complex coordinate systems, are easily performed by processors contained in a typical home computer.

Figure 3A:
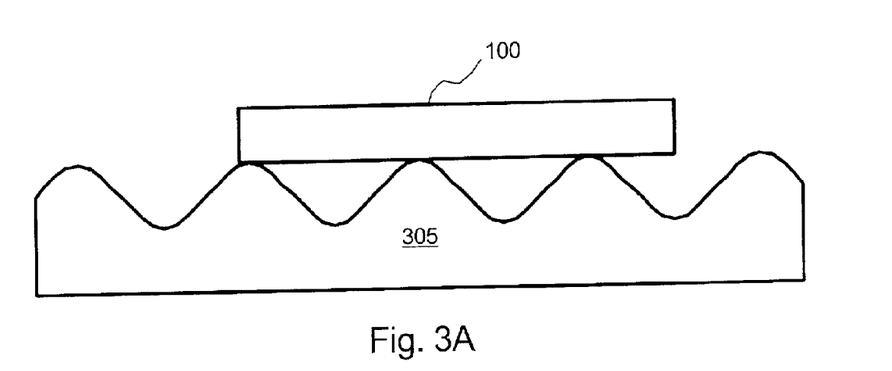
FIGS. 3A–3B are side views of a template for imparting a texture to a shrinkable print media in accordance with an embodiment of the invention.
Figure 3B:
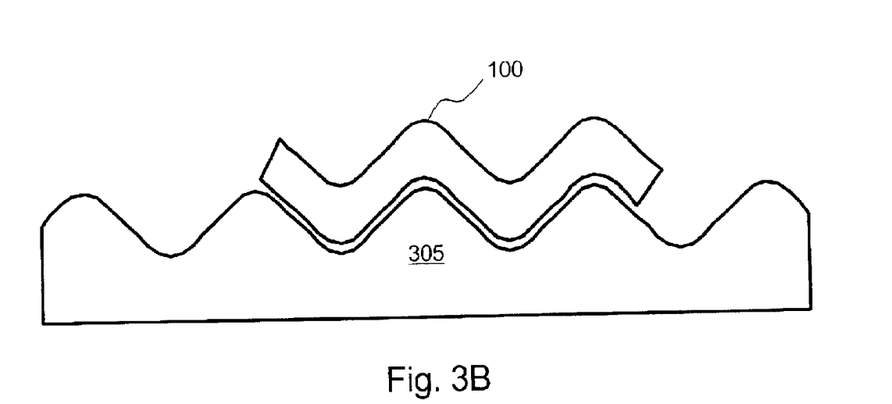

During exposure to heat, the print media softens to facilitate shrinking. In this softened state, textures can be embossed on a surface of the print media that will be retained upon cooling the print media below its glass transition temperature. FIG. 3A is a side view of a template 305 for imparting a texture to a surface of a softened, post-shrink print media 100. In its softened state, the print media 100 can assume the texture of the template 305 as shown in FIG. 3B. To aid in texturing the surface of the print media 100, pressure may be applied to the print media 100 using a weight (not shown) that may either be flat or mated to the template 305. While the template 305 is depicted to have a regular pattern of hills and valleys, any texture can be used. As one example, the template 305 could have a texture to simulate poured glass. Using this example, shrunken output images could be used to produce a stained-glass effect. Kits may be provided having shrinkable print media and an accompanying template or templates for various craft projects, e.g., faux stained glass. Similar to texturing, three-dimensional shapes may be imparted to the softened print media that will be retained upon cooling the print media below its glass transition temperature. Shape templates could be made of the same or similar materials as texture templates. The print media could be applied to the shape template either before shrinking or after shrinking under heating to return the media to a softened state. Variously shaped curved surfaces could be used to form the print media into items like soap dishes, round mandrels could be used for drooping bowls, rectangular bars could be used as a drooping template for business card holders, etc. These shape templates could also impart texture, if desired.

Figure 4A:
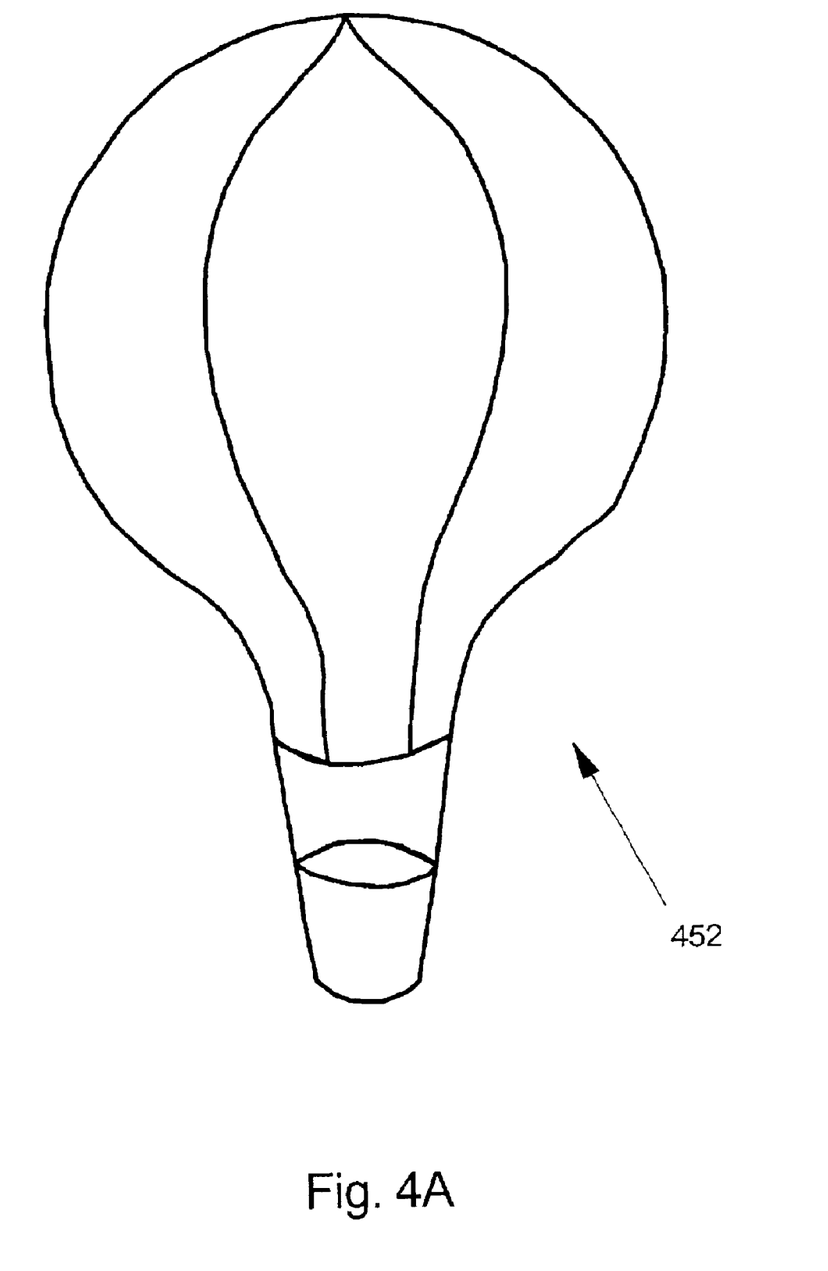
FIGS. 4A–4C are views depicting stages in the production of a faux stained glass item in accordance with an embodiment of the invention.
Figure 4B:
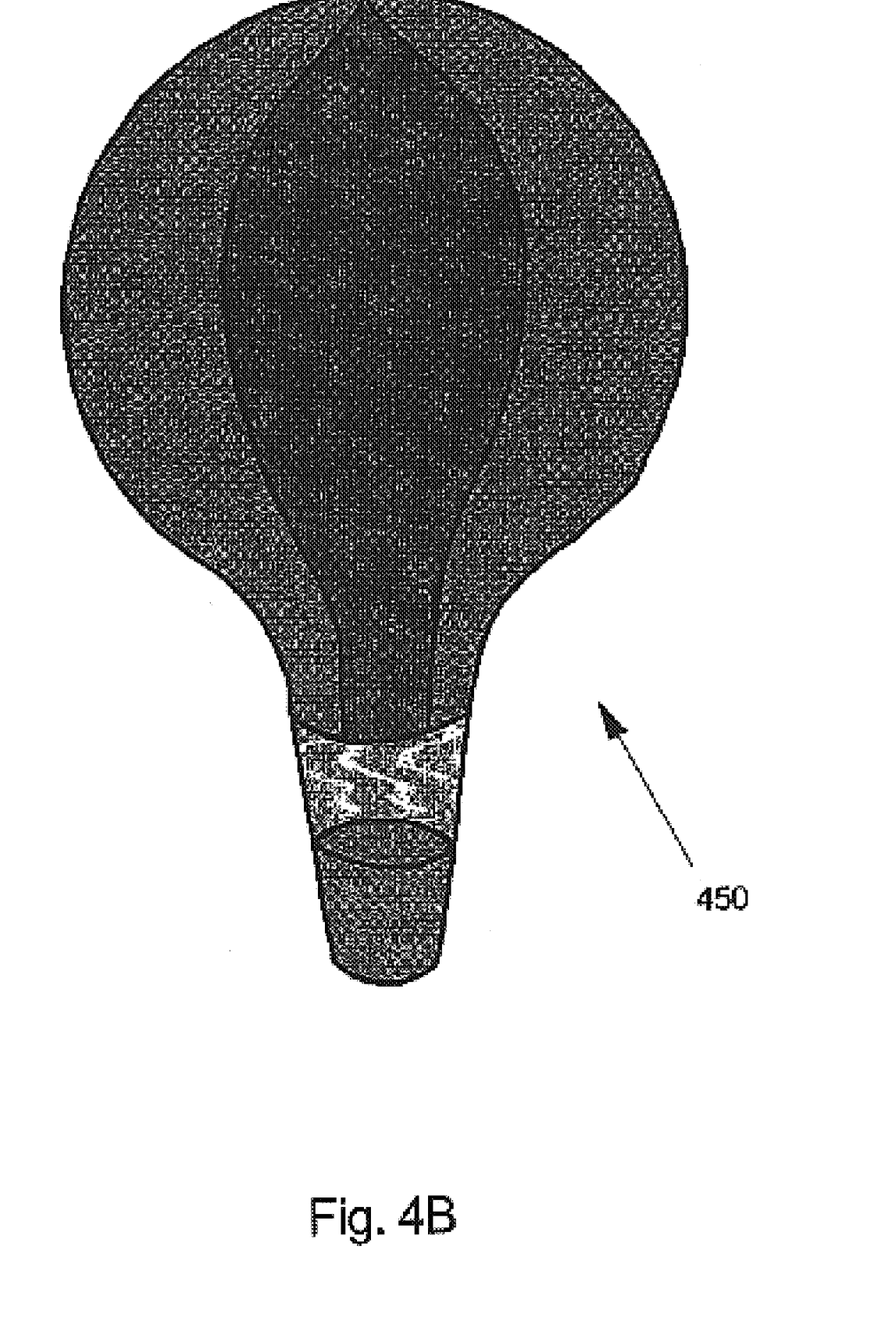

To carry the example of faux stained glass forward, a pattern 452 can be defined as shown in FIG. 4A. The pattern 452 can be edited by a user to produce the image 450 as shown in FIG. 4B. Such editing may include modifying colors of various elements of the pattern 452 as well as resizing the pattern 452. The image 450 is then transferred to a shrinkable print media 100 as an output image using an imaging device. As described above, image data representative of output image is generated from the image 450 that is adapted for use by the imaging device. Adapted for use by the imaging device does not require that the imaging device be able to use the image data directly. In fact, it is common for a software application to provide such image data in a format compatible with the operating system upon which the application is running, and to have a device driver specific to the operating system and the imaging device provide a translation between the operating system compatible format and a format for use by the imaging device. As such, adapted for use by an imaging device includes image data that is in a format compatible with a driver for the imaging device.

Figure 4C:
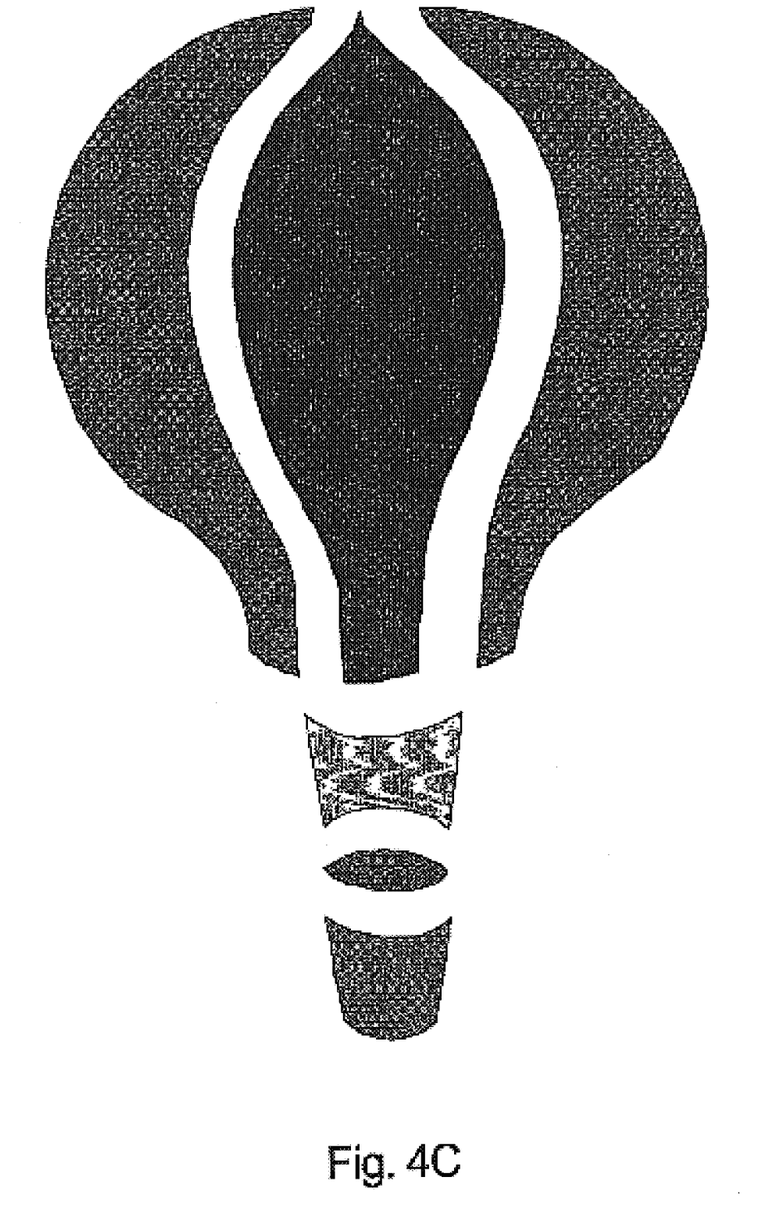

The output image may be kept intact, similar to the image 450 depicted in FIG. 4B, or it may be separated into sections, such as is depicted in FIG. 4C. Separation of the output image into sections is most easily accomplished prior to shrinking when the print media is relatively thin, although there is no prohibition to sectioning the output image after shrinking when the thickness has increased. After shrinking, the sections may be assembled using standard stained glass techniques, although plastic leading may be preferred over standard leading to avoid concerns about melting or burning the plastic sections with lead solder. As discussed above, during or after shrinking the sections, the softened sections can be placed on a textured template to impart a texture of poured glass. Larger faux stained glass projects can be accommodated by sectioning the image prior to producing the output image. In this manner, a section could be made as large as the maximum printable area of the print media.

Beyond imitating the texture of actual stained glass, embodiments of the invention can be used to create stained-glass effects that change with variations in available lighting or variations in ambient temperature. Because of the relatively low temperature of many shrinkable plastics for use in shrinkable print media, photochromic or thermochromic inks may be used to produce the output image. In this manner, variations in available lighting can create varying effects in an output image produced using photochromic inks while variations in ambient temperature can create varying effects in an output image produced using thermochromic inks.

Figure 5A:
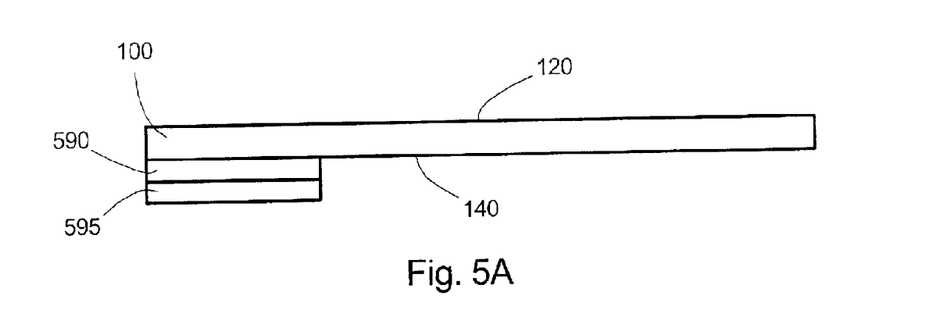
FIGS. 5A–5C are views of a print media in accordance with embodiments of the invention.

FIG. 5A is a sectional view of a print media 100 having an attached adhesive 590. The print media 100 may further have a liner 595 used to protect the adhesive 590 during handling or printing. The adhesive 590 may cover only a portion of the surface 140 of the print media 100 as shown in FIG. 5A. Alternatively, the adhesive 590 may cover the entire surface 140. Also, the adhesive 590 may only be on an edge of the print media 100 as shown in FIG. 5A, or it may form some other contiguous or non-contiguous pattern on the surface 140. The adhesive 590 is preferably a pressure-sensitive adhesive or solvent-activated adhesive. For a solvent-activated adhesive, the liner 595 may be unnecessary. A liner 595 lacking or having a different expected extent of shrinkage than the bulk of the print media 100 should be removed during shrinking to avoid interfering with the shrink process. It is noted that the drawings herein are not drawn to scale and that the height differential of the print media 100 between portions containing adhesive 590 and portions devoid of adhesive 590 would not be as dramatic as it might appear in FIG. 5A.

Figure 5B:
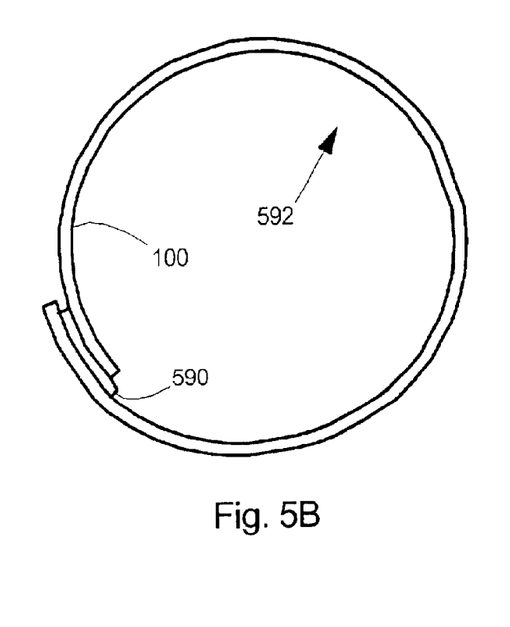
Figure 5C:
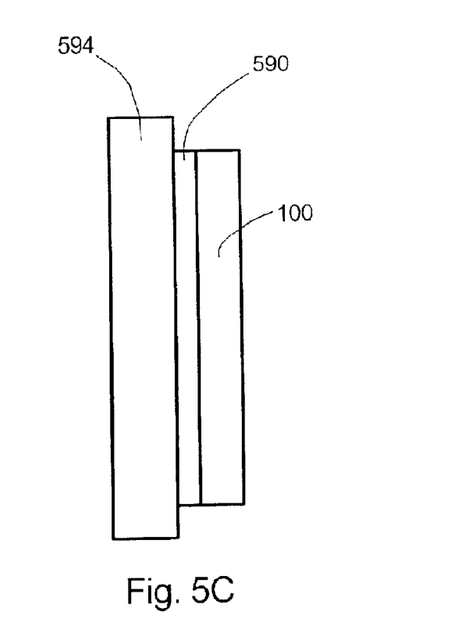

The adhesive 590 is adapted for use in temperatures or other conditions necessary for the shrinking of the print media 100. The adhesive 590 may be used to attach the print media 100 to itself, e.g., to form a ring 592 as shown in FIG. 5B. Such a ring could be used to decorate such items as eggs, cups, mugs or other substantially cylindrical items. Because various embodiments provide for definition of a post-shrink size of an output image, such decoration can be sized to produce a snug fit to the item without producing undue stress on the adhesive bond. Alternatively, the adhesive 590 can be used to attach the print media to some other object 594 as shown in FIG. 5C.

In use, the print media 100 is supplied or fed to an imaging device, e.g., inkjet printers, laser printers, copiers and other similar imaging devices, whether local or networked. An output image is generated on the printable surface 120 of the print media 100. The output image can then be reduced by exposure to heat or other mechanism, e.g., exposure to radiation or microwaves, that is compatible with the material of construction of the shrinkable print media 100.

Figure 6:
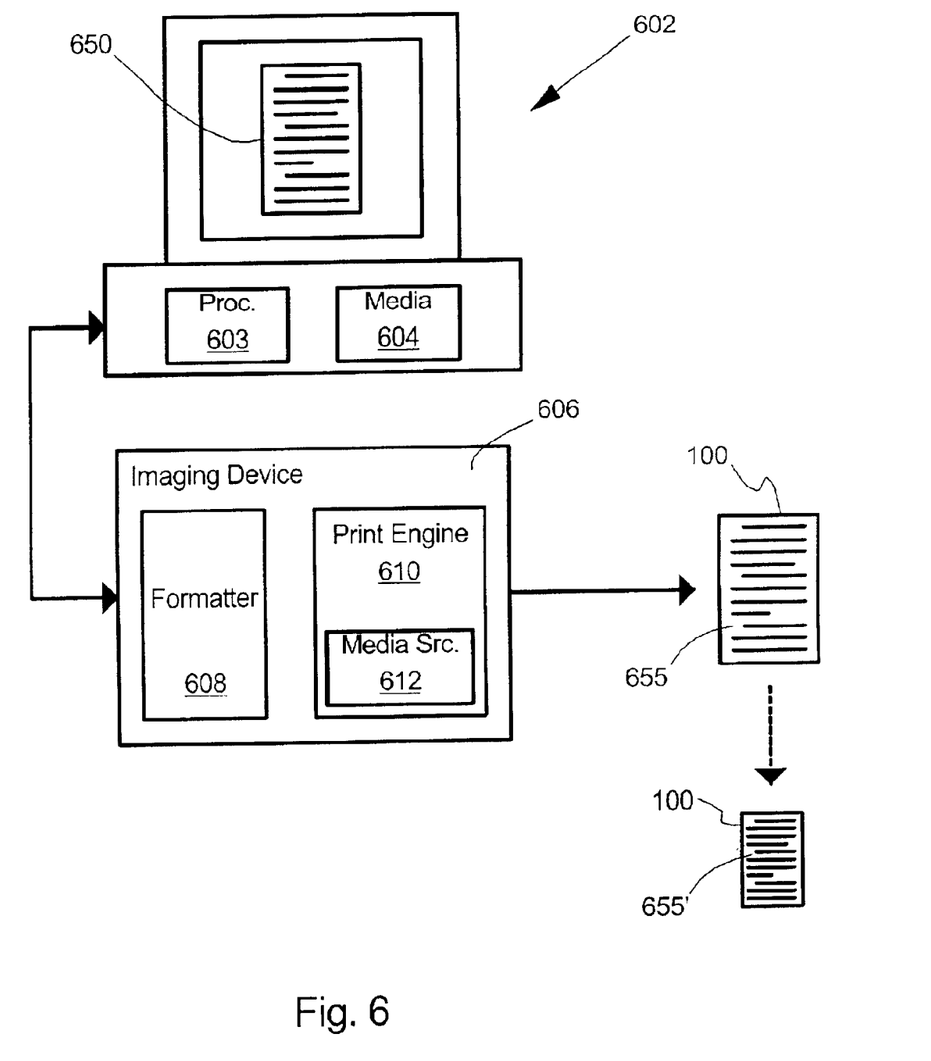
FIG. 6 is a schematic of a system for use in generating an output image in accordance with an embodiment of the invention.

FIG. 6 is a schematic of a system for use in generating a stretchable image in a preferred embodiment of the invention. The system includes a personal computer, workstation or other processor-based device 602 used to generate and display an image 650. The image 650 can represent anything within the imagination of the user, whether it be text, a drawing, a photograph or some other image. The processor-based device 602 includes a processor 603 and a computer-usable media 604 in communication with the processor 603. The processor 603 generates image data representative of the image 650 and, thus, the desired output image 655. The image data is provided to an imaging device 606. For one embodiment, the imaging device 606 is an inkjet printer, although other imaging devices as described above are also usable with embodiments of the invention. If the imaging device 606 is in direct communication with the processor-based device 602, e.g., a printer coupled to a personal computer, the imaging device 606 is termed a local imaging device. If communication between the processor-based device 602 and the imaging device 606 is through a communication network, the imaging device 606 is termed a network imaging device.

The processor 603 is adapted to perform methods in accordance with embodiments of the invention in response to computer-readable instructions. These computer-readable instructions are stored on the computer-usable media 604 and may be in the form of either software, firmware or hardware. In a hardware solution, the instructions are hard coded as part of a processor, e.g., an application-specific integrated circuit (ASIC) chip. In a software or firmware solution, the instructions are stored for retrieval by the processor. Some additional examples of computer-usable media include static or dynamic random access memory (SRAM or DRAM), read-only memory (ROM), electrically-erasable programmable ROM (EEPROM), magnetic media and optical media, whether permanent or removable. Most consumer-oriented computer applications are software solutions provided to the user on some removable computer-usable media, such as a compact disc read-only memory (CD-ROM).

The imaging device 606 has a formatter 608 for interpreting the image data and rendering the image data into a printable image. The printable image is provided to a print engine 610 to produce a tangible output image 655. The output image 655 is produced on a print media 100 in accordance with an embodiment of the invention. The print engine 610 represents the mechanical aspects of the imaging device 606. The print engine 610 further includes a source 612 for supplying the print engine 610 with the print media 100. Examples of the source 612 include media trays or by-pass feeders.

After production of the output image 655 on a printable surface of the print media 100, the output image 655 may be shrunk by exposing the print media 100 to heat or other appropriate mechanism adapted to shrink the print media 100 to produce the post-shrink output image 655'.

CONCLUSION

Apparatus and methods for the use of shrinkable print media have been described. Various embodiments generate image data accounting for a desired size of an output image and an expected extent of shrinkage of the shrinkable print media. The image data is adapted for use by an imaging device to produce the output image having a size such that an output image having that size prior to shrinking would be expected to have the desired size after shrinking. Further embodiments provide a shrinkable print media having an adhesive attached to at least a portion of one surface. Still further embodiments provide print media kits having shrinkable print media and one or more templates adapted to impart a texture and/or shape to the shrinkable print media in a softened state.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A method of using a shrinkable print media, comprising:
   determining a desired size of an output image; and
   generating image data representative of the output image and accounting for the desired size of the output image and an expected extent of shrinkage of the print media;
   wherein the image data is adapted for use by an imaging device to produce the output image on the print media having a second size that is greater than the desired size.

2. The method of claim 1, further comprising calculating the second size such that reducing an output image having the second size by the expected extent of shrinkage of the print media would produce an output image having the desired size.

3. The method of claim 1, further comprising generating the output image on a printable surface of the print media in response to the image data.

4. The method of claim 3, further comprising shrinking the print media by its expected extent of shrinkage.

5. The method of claim 4, further comprising texturing a surface of the print media.

6. The method of claim 5, wherein texturing a surface of the print media further comprises imparting a texture to the surface of the print media to imitate the appearance of poured glass.

7. The method of claim 4, further comprising imparting a shape to the print media.

8. The method of claim 7, further comprising texturing a surface of the print media.

9. The method of claim 1, wherein the expected extent of shrinkage is asymmetrical.

10. A method of using a shrinkable print media, comprising:
    determining an expected extent of shrinkage of the print media in a first planar dimension and a second planar dimension;
    determining a desired size of an output image in the first planar dimension and the second planar dimension;
    generating a second size of the output image in the first planar dimension and the second planar dimension, wherein reducing an output image of the second size by the expected extent of shrinkage of the print media would generate an output image having the desired size; and
    generating image data representative of the output image and adapted for use by an imaging device to produce the output image on the print media having the second size.

11. The method of claim 10, wherein the expected extent of shrinkage of the print media in the first planar dimension is substantially equal to the expected extent of shrinkage of the print media in the second planar direction.

12. The method of claim 10, further comprising:
    generating the output image on the print media using a marking material comprising ink.

13. The method of claim 12, wherein the ink is selected from the group consisting of thermochromic ink and photochromic ink.

14. A method of using a shrinkable print media, comprising:
    determining an expected extent of shrinkage of the print media in a first planar dimension and a second planar dimension;
    determining a desired size of an output image in the first planar dimension and the second planar dimension;

generating a second size of the output image in the first planar dimension and the second planar dimension, wherein reducing an output image of the second size by the expected extent of shrinkage of the print media would generate an output image having the desired size; and generating image data representative of the output image and adapted for use by an imaging device to produce the output image on the print media having the second size;

wherein determining a desired size of the output image further comprises:

determining a maximum post-shrink size of a printable surface of the print media if the print media were reduced by its expected extent of shrinkage;

accepting input from the user to generate a display image having an indicated size; and determining the desired size of the output image from data representative of the indicated size of the display image and bounded by the maximum post-shrink size of the printable surface.

15. The method of claim 14, further comprising:

defining margins for the maximum post-shrink size of the printable surface; and displaying the margins associated with the display image.

16. The method of claim 15, further comprising:

reducing the indicated size of the display image to fit within the margins.

17. A computer-usable medium having computer-readable instructions stored thereon capable of causing a processor to perform a method, the method comprising:

determining a desired size of an output image;

determining a desired print media for use in generating the output image;

determining an expected extent of shrinkage of the desired print media; and generating image data representative of the output image and accounting for the desired size of the output image and an expected extent of shrinkage of the print media;

wherein the image data is adapted for use by an imaging device to produce the output image on the print media having a second size that is greater than the desired size.

18. A computer-usable medium having computer-readable instructions stored thereon capable of causing a processor to perform a method, the method comprising:

determining a desired size of an output image;

determining a desired print media for use in generating the output image;

determining an expected extent of shrinkage of the desired print media;

limiting the desired size of the output image to a maximum post-shrink size of a printable surface of the desired print media; and generating image data representative of the output image and accounting for the desired size of the output image and an expected extent of shrinkage of the print media;

wherein the image data is adapted for use by an imaging device to produce the output image on the print media having a second size that is greater than the desired size.

* * * * *